United States Patent
Matthys et al.

(10) Patent No.: US 7,661,467 B1
(45) Date of Patent: Feb. 16, 2010

(54) METHODS TO CONTROL HEAT TRANSFER IN FLUIDS CONTAINING DRAG-REDUCING ADDITIVES

(76) Inventors: Eric F. Matthys, 1263 San Antonio Creek Rd., Santa Barbara, CA (US) 93111; Kazimir Gasljevic, 2519 Chapala St., Santa Barbara, CA (US) 93105

( * ) Notice: Subject to any disclaimer, the term of this patent is extended or adjusted under 35 U.S.C. 154(b) by 1717 days.

(21) Appl. No.: 09/786,140

(22) PCT Filed: Feb. 9, 1999

(86) PCT No.: PCT/US99/20220

§ 371 (c)(1),
(2), (4) Date: Feb. 28, 2001

(87) PCT Pub. No.: WO00/14455

PCT Pub. Date: Mar. 16, 2000

(51) Int. Cl.
*F28F 13/12* (2006.01)
(52) U.S. Cl. .................................................. 165/119
(58) Field of Classification Search .................. 165/96, 165/109.1, 119, 164, 166, 181, 112, 806, 165/6
See application file for complete search history.

(56) References Cited

U.S. PATENT DOCUMENTS

| | | | |
|---|---|---|---|
| 4,534,875 A | 8/1985 | Rose | |
| 4,702,312 A * | 10/1987 | Brown | 165/179 |
| 5,143,635 A | 9/1992 | Young et al. | |
| 6,112,806 A * | 9/2000 | Kawaguchi et al. | 165/164 |

* cited by examiner

*Primary Examiner*—Patricia Bianco
*Assistant Examiner*—Nihir Patel

(57) ABSTRACT

A drag reducing fluid pumped (22) through a heat exchanger (12).

3 Claims, 2 Drawing Sheets

METHODS TO CONTROL HEAT TRANSFER IN FLUIDS CONTAINING DRAG-REDUCING ADDITIVES

RELATED APPLICATIONS

The present application is a continuation-in-part application of application Ser. No. 09/148,029, filed Sep. 3, 1998 which in turn was related to provisional patent application Ser. No. 60/057,924, filed on Sep. 4, 1997, both of which are incorporated herein by reference as if set forth in their entirety.

BACKGROUND OF THE INVENTION

1. Field of the Invention

This invention relates to the recovery of the heat transfer in heat exchangers in circulation loops in which drag-reducing surfactant solutions are used for reduction of pumping power expended to pump heat exchanging fluid through the hydronic system.

2. Description of the Prior Art

Drag-reducing additives can decrease friction in pipes with all else being equal. This reduced pipe wall friction does result in a decrease in the pumping power necessary to circulate a fluid in a piping system, or alternatively could result in greater flow rate or even in longer system reach than without additives. A decrease in pumping power would save energy in many systems such as recirculating hydronic HVAC systems or other types where water or another fluid are used as thermal transport agent for cooling or heating.

Unfortunately, if the system includes heat exchangers, the heat transfer is also greatly decreased by the additives and the heat exchangers show reduced efficiency. In the case of a cooling system, for example, the chiller has to work with larger refrigerant temperature difference, and the energy savings in the pumps are countered by the additional chiller work, and the total energy savings may be reduced, eliminated, or there could even be a net increase in overall system energy use. A similar effect is seen in heating systems. By introducing a conventional heat transfer enhancement device it is possible to modify the flow and to increase heat transfer as in the case of water, but this is generally not a suitable solution because the losses due to the insert are too high in many cases.

Drag-reducing surfactant solutions have been used for reducing pumping power in circulation systems under turbulent flow conditions. The reduced heat transfer that inevitably accompanies drag reduction in any turbulent pipe flow was accepted as an undesirable by-effect in most applications or uses. Special types of heat exchangers, like plate heat exchangers, which make use of narrow passages instead of pipes, show smaller heat and drag reductions. In general, however, the application of drag-reducing additives in any circulation system that includes heat transfer in most possible applications is inhibited by reduction of heat transfer efficiency in the heat exchangers.

What is needed is an apparatus and method whereby the use of any type of heat exchanger with drag-reducing surfactant additives can be realized without substantial or excessive reduction in heat transfer.

BRIEF SUMMARY OF THE INVENTION

Instead of modifying just the flow, it is possible to modify the fluid temporarily by a suitable fluid degrading device. This has to be done so as not to require too much flow work, but yet to still destroy the fluid structure for a suitable period of time sufficient to cover the residence time of the fluid in the heat exchanger. According to the invention it is possible to customize the fluid to achieve the desirable recovery time needed. This can then be used to control heat transfer. This may also be done in some cases done through a temperature jump.

According to the invention it is possible to find or develop a fluid that would have suitable characteristics so as to optimize the application of the invented method of heat transfer control by achieving the temperature independence of drag reducing, degradation and recovery characteristics of the drag reducing surfactant solution.

More particularly the invention is an improvement in a heat exchanger comprising a surfactant solution flowing through the heat exchanger which reduces fluid drag within the hydronic system.

The surfactant solution is characterized by a predetermined recovery time as defined by ability of the surfactant solution to rebuild molecular or micellar structures after disruption of the molecular or micellar structures. A degrading device creates a stress field in or before the heat exchanger to break or disrupt the molecular or micellar structures in the surfactant solution by high local shear stresses so that heat transfer rate of the surfactant solution is increased, by elimination of drag and heat transfer reducing ability of the degraded surfactant solution for a predetermined distance downstream from the degrading device during which recovery time the molecular or micellar structures are being rebuilt. The term "solution" is used in the specification and claims to encompass not only a solute in a solvent, but also mixtures of components and colloidal suspensions of a colloid.

The invention is also defined as a method of heat exchange comprising the steps of providing a surfactant solution as a heat exchanging fluid in a heat exchanger, which surfactant solution reduces fluid drag within the heat exchanger disposed in the heat exchanger. The surfactant solution is characterized by a predetermined recovery time as defined by ability of the surfactant solution to rebuild molecular or micellar structures after disruption of the molecular or micellar structures. The flow in the heat exchanger is disturbed to break or disrupt the molecular or micellar structures in the surfactant solution by high local shear stresses so that heat transfer rate of the surfactant solution is increased by elimination of drag and heat transfer reducing ability of the degraded surfactant solution for a predetermined distance downstream from the disturbance during the recovery time, during which the molecular or micellar structures are being rebuilt.

The invention is still further defined as a method of heat transfer recovery in turbulent flow of drag reducing surfactant solutions comprising the steps of providing a degrading device which degrades the fluid with minimum pressure drop, creating temporary degradation of a circulating fluid, and conditioning of the drag reducing fluid properties relevant for degradation and recovery.

The invention is also the fluid itself which has optimized properties of stress resistance and recovery comprising a thermal transport fluid, such as water, and a surfactant additive capable of withstanding stress in all pipes and fittings of a circulation system and providing asymptotic drag reduction in the pipelines of the circulation system.

In a heat exchanger the fluid is degraded by a degrading device. The drag and heat transfer reductions are temporarily substantially eliminated. The fluid remaining substantially degraded during its residence in the heat exchanger after which recovery occurs quickly after the fluid exits from heat exchanger.

In one embodiment the fluid and surfactant in combination are characterized by a drag reduction recovery having a long dead time when the drag-reduction has been essentially eliminated and a subsequent fast recovery to a substantially undegraded drag reduction level.

The invention is still further defined as a fluid having optimized properties of degradation and recovery comprising a thermal transport fluid, such as water, and a surfactant additive having, when added to thermal transport fluid, a substantial independence of recovery and degradation properties as a function of temperature. The surfactant additive comprises two or more types of surfactants with opposing effects of degradation and recovery parameters as a function of temperature. The additive may comprise a cationic surfactant and a nonionic surfactant, or any other combination of surfactants now known or later devised, which combination is temperature independent or substantially temperature independent. The opposing effects of the two or more types of surfactants (e.g. cationic surfactant and nonionic surfactant) substantially cancel each other to provide a substantially temperature independent surfactant additive.

The invention is also a heat exchanger comprising a first heat exchanging fluid path, and a second heat exchanging fluid path. At least one of the first and second heat exchanging fluid paths further comprises a dedicated degrading device disposed therein. A heat exchanging fluid with a temporarily degradable drag reducing surfactant additive flows in the corresponding heat exchanging fluid path.

The dedicated device is used exclusively for degrading a heat exchanging fluid flowing through the heat exchanger. The most effective dedicated degrading device imposes a flow disturbance or shear stress uniformly across a cross section of the corresponding heat exchanging fluid path in which the dedicated degrading device is disposed. The dedicated degrading device exposes every surfactant particle flowing in the corresponding heat exchanging fluid path to at least a supercritical stress, which is the amount of stress sufficient to substantially eliminate the drag reducing characteristics of the surfactant solution. The stress imposed by the dedicated degrading device is not significantly higher than the supercritical stress so that the flow energy needed for degradation is minimized. Ideally, the dedicated degrading device is disposed at or near an inlet to the corresponding heat exchanging fluid path.

In the preferred embodiment, the dedicated degrading device comprises a wire mesh disposed across the corresponding heat exchanging fluid path, which also functions as a filter. It is to be expressly understood that many other types of dedicated degrading devices are expressly within the scope of the invention other than mesh obstructions, including specifically devices which do not create an uniform fluid stress, such as valves, pumps, filters, helices, orifices, wires and the like.

Again the invention can be defined as a heat exchanger comprising a first heat exchanging fluid path, and a second heat exchanging fluid path, wherein at least a corresponding one of the first and second heat exchanging fluid paths further comprises a conventional hydraulic component normally found in a circulation system. The hydraulic component is disposed upstream and in proximity to the corresponding heat exchanging fluid path. A heat exchanging fluid with a temporarily degradable drag reducing surfactant additive is disposed in the corresponding heat exchanging fluid path.

The invention is defined as a method of heat transfer recovery in turbulent flow in a heat exchanger of a drag reducing surfactant fluid characterized by drag reducing fluid properties for degradation and recovery comprising the steps of conditioning the drag reducing fluid properties of the drag reducing surfactant fluid. A degrading device is provided which degrades the fluid with minimum pressure drop. An initial temporary degradation of a circulating fluid is created, and after the fluid is initially degraded one or more smaller disturbances are created downstream to prevent fluid from recovery. A smaller pressure drop than the one used for the initial degradation upstream of heat exchanger can be used to create the smaller disturbances.

In one embodiment the step of conditioning the drag reducing fluid properties of the drag reducing surfactant fluid comprises conditioning the fluid so that it has a faster recovery to achieve asymptotic drag reduction immediately downstream from the heat exchanger.

In another embodiment the step of conditioning the drag reducing fluid properties of the drag reducing surfactant fluid comprises conditioning the fluid so that shear stress generated by pipe stress in the heat exchanging fluid paths of the heat exchanger degrade the fluid.

In still a further embodiment the step of conditioning the drag reducing fluid properties of the drag reducing surfactant fluid comprises conditioning the fluid so that shear stress generated by pipe stress in the heat exchanging fluid paths of the heat exchanger prevents the fluid which has been degraded by the degrading device from recovering.

The invention is still further defined as a fluid characterized by degradation and recovery of its drag reducing properties. The fluid comprises a base component and a surfactant having drag-reducing, fluid degradation, and fluid recovery properties which are substantially independent of temperature when combined with the base component.

The invention is also defined as a method of determining the elimination of drag reducing properties in a fluid including a surfactant comprising the steps of providing a flow of the fluid, providing a degrading device in the flow to eliminate the drag reducing properties of the fluid, creating a pressure drop across the degrading device, and measuring the pressure drop as an indicator of resistance to elimination of the drag reducing properties in the fluid.

The invention now having been briefly summarized, it may now be visualized by reference to the following drawings wherein like elements are referenced by like numerals.

The invention and its various embodiments can now be understood by turning to the following detailed description.

DETAILED DESCRIPTION OF THE PREFERRED EMBODIMENTS

Figure 1:
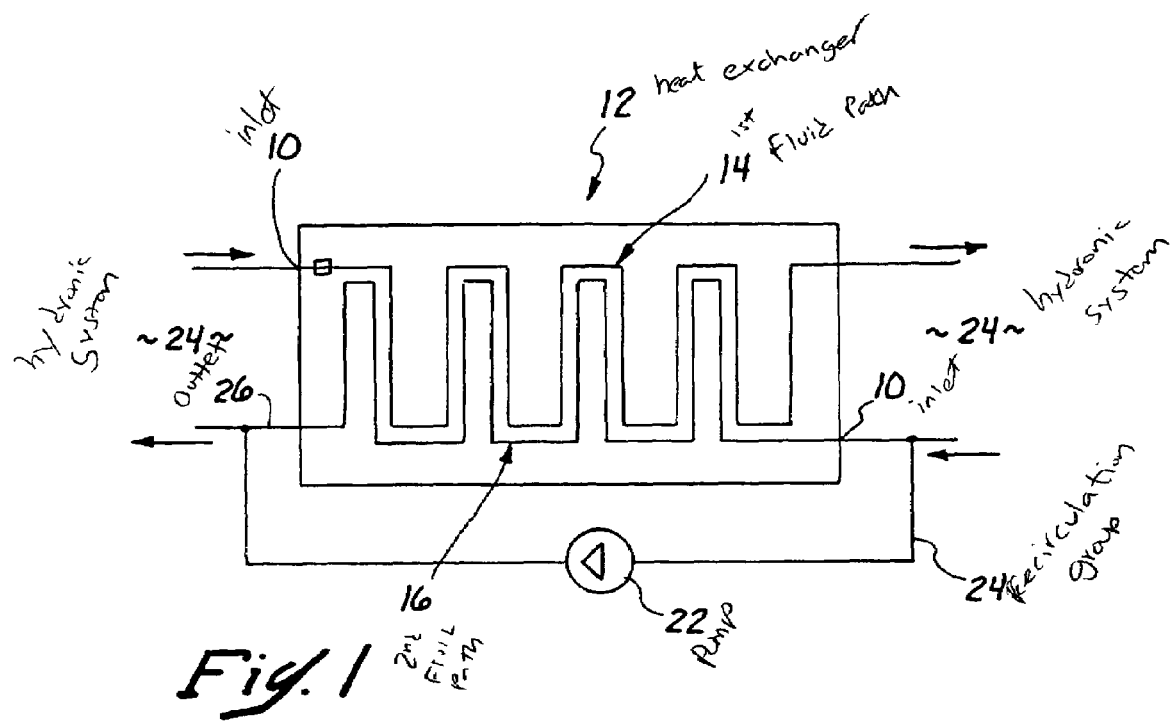
FIG. 1 is a diagram symbolically depicting a heat exchanger.

Sufficient mechanical stress imposed on a fluid breaks the micellar structures or micelles themselves, which are the agents affecting turbulence in the flow and causing the drag reduction phenomenon. In this way drag reduction and heat transfer reduction are temporarily turned off. FIG. 1 is a symbolic depiction of a heat exchanger, generally denoted by reference numeral 12. Heat exchanger 12 has a first heat exchanging fluid path 14 in heat exchange relationship with a second heat exchanging fluid path 16. A first fluid flows through fluid path 14 and absorbs heat from a second fluid flowing through fluid path 16. FIG. 1 shows a counterflow heat exchanger, but any type or design heat exchanger desired could be employed and the symbolic depiction of FIG. 1 is meant to encompass all types. Heat exchanger 12 may be part of any hydronic system 24 now known or later devised, expressly including any heating or cooling application, or combination of heating and cooling.

Figure 2:
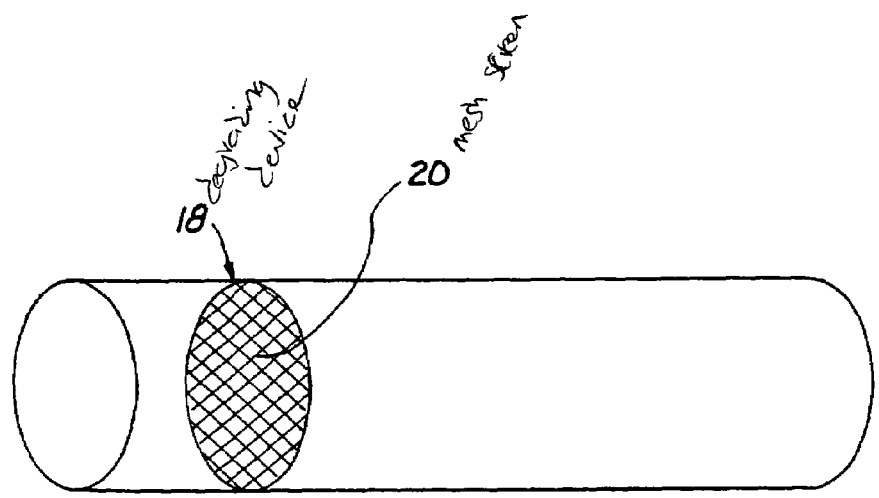
FIG. 2 is a simplified perspective of a fluid degrading device comprised of a grid or screen insert.

In one embodiment, a recirculation loop 24 is provided in one of the fluid paths 16 by which fluid is pumped from outlet 26 by pump 22 to a point at or immediately upstream from inlet 10 to increase the flow rate of fluid through heat exchanger 12 relative to the rest of the hydronic system. By this increased flow rate through the heat exchanger, the heat transfer rate is increased by two mechanisms. First, increased flow velocity increases the shear stress in the heat exchanger pipes and causes degradation of the surfactant solution (change of the fluid properties). Second, increased velocity directly increases heat transfer by increased turbulence (change in the flow). The total effect can provide even a higher heat transfer rate than it was originally, without the use of surfactant additive, at the nominal flow rate through the heat exchanger The first and/or second fluid can be mechanically degraded at the corresponding inlet 10 to the heat exchanger 12 for each fluid by a degrading device 18, providing the same level of heat transfer as with water for circulating fluid, as long as the fluid remains degraded. Any type of degrading device 18 which applies stress to the fluid to create turbulence to break the micelles or their structure, which device is now known or later devised, may be employed. FIG. 2 shows by way of example only an insert comprised of a grid or mesh screen 20 disposed across the inner diameter of the pipe. A plate provided with a plurality of apertures or a grating would be included within the explicit range of equivalents of a grid or screen insert, and so would various other devices including wire loops, wall roughnesses, helices, and any other structure capable of creating fluid stress.

Immediately after the excessive stress is removed from the fluid such as occurs when the fluid flows downstream from device 18, the process of rebuilding of micelles and micellar structures begins. The time needed for the total recovery of the fluid drag-reducing ability (hereinafter the "recovery time") should be long enough that the fluid does not show any significant local heat transfer reduction over the residence time of the fluid in heat exchanger 12. An ideal fluid is degraded by degrading device 18 exerting a moderate pressure drop on the flow, but a higher pressure drop than exerted by conventional pipe fittings such as elbows and connectors. The fluid remains totally degraded during its residence time in heat exchanger 12, and recovers quickly as soon as it exits heat exchanger 12.

Fluid properties can be optimized for this purpose, as can the design of degrading device 18 by any one of a number of ways now known or later devised without departing from the scope and spirit of the claimed invention. Different variations on the basic idea are possible, depending on the size and the type of the circulation system in which heat exchanger 12 is included. For example, fluids with a long recovery time may not be provided with additional degradation devices 18 inside heat exchanger 12 beyond an initial degradation device 18, as may be suited for large heat exchangers, while fluids with a short recovery time are provided with multiple degrading devices 18 inside heat exchanger 12, as may be suited for small heat exchangers.

A special case is a weak fluid degraded by the relatively high or higher than normal wall shear stress in heat exchanger 12. A weak fluid is defined as a fluid with a low critical wall shear stress and/or long recovery time, such as a shear stress close to the level normally encountered in a pipe at nominal fluid velocity. Examples of weak fluids include, but are not limited to lower concentration solutions, and solutions close to their critical temperatures.

Elements of the circulation system like conventional pumps, filters, and flow control valves can be used as degrading devices 18 for degradation if located upstream of heat exchanger 12, thereby eliminating the need for a dedicated degrading device 18, and avoiding the need for an additional pressure drop in the system.

Drag-reducing surfactant solutions reduce friction losses in turbulent pipe flow. However, when the turbulent exchange of momentum is reduced, so is the turbulent exchange of heat. As a result, the heat transfer in the pipes in heat exchanger 12 is reduced too, impairing or prohibiting the use of drag-reducing in systems that involve most types of heat exchangers 12. The conventional techniques used for increasing heat transfer by turbulence enhancement for Newtonian non-drag reducing fluids are effective in increasing heat transfer only up to a factor of 2 to 3 times, and then become prohibitively inefficient, because of exceedingly high pressure drops in the case where the heat transfer has to be increased by factor of 10, such as in asymptotic drag reduction, which is defined as the maximal drag reduction that can be achieved by drag-reducing additives, typically up to 90% at high enough velocities.

According to the invention the surfactant solution in the heat exchanging fluid or fluids is temporarily degraded preferably for the time the fluids spends in heat exchanger 12, and during that time temporarily loses its properties of drag and heat transfer reduction. The degraded fluid preferably recovers as soon as possible after it exits from heat exchanger 12 to provide desirable drag reduction in the rest of the circulation system.

The most generally applicable means of temporary degradation is by mechanical stress. As discussed above in connection with FIG. 1 the basic and ideal principle is that the fluid is degraded by degrading device 18 at the very inlet 10 to heat exchanger 12, after which it remains completely degraded for the time it spends in heat exchanger 12. The fluid recovers immediately and completely as it exits heat exchanger 12. However, the scope of the invention explicitly includes the disposition of an initial degrading device 18 at any position within in heat exchanger 12. If desired additional degrading devices 18 may be placed at any position downstream from the initial device 18. In the case where multiple degrading devices 18 are used, it is not necessary that they be identical in design or that identical designs be used in both flow fluid paths 14 and 16.

It must be expressly understood that while mechanically induced stress on the fluid is preferred, the stress may be created on the heat exchanging fluid by any mechanism desired including hydrodynamic, ultrasonic, electromagnetic, temperature jumps, or by any other means known or later discovered.

Figure 3:
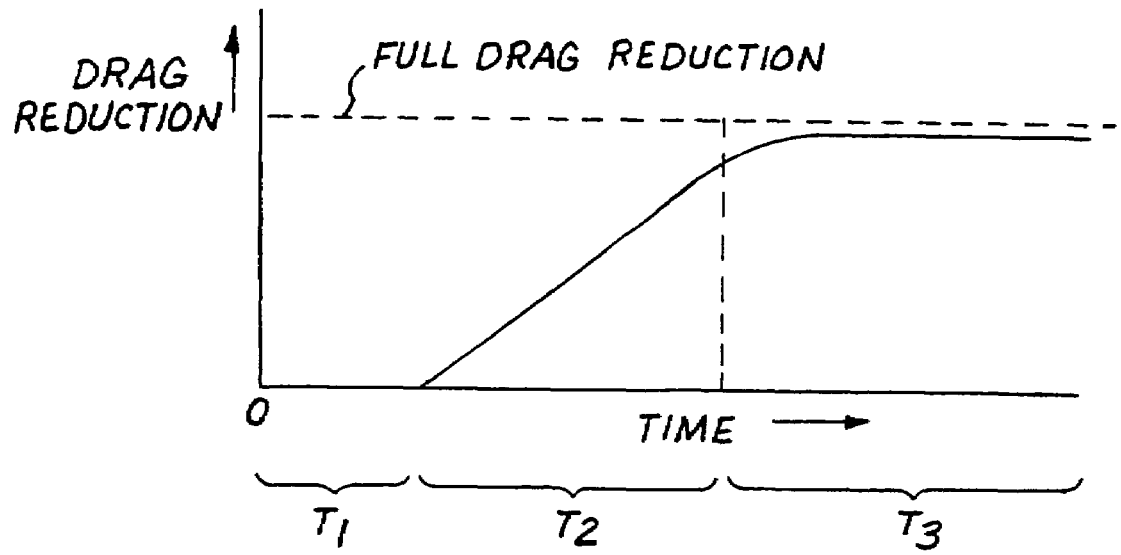
FIG. 3 is a graph showing the drag reduction capacity of a surfactant solution as a function of time after the location of the degrading device exerting the pressure drop needed for the full degradation.

Several concepts are needed for description of the degradation and recovery phenomena utilized in the invention, namely: (1) a state of complete degradation (zero drag reduction and zero heat transfer reduction), (2) the pressure drop on the degrading device (i.e. amount of energy for a unit volumetric flow rate) needed for complete degradation, and (3) the recovery time. The recovery time consists of a dead or hidden recovery time T1 with no signs of recovering drag reduction, and a time T2 of approximately linearly increasing drag reduction until T3 when full drag reduction is recovered as diagrammatically depicted in FIG. 3. Related, but not identical to the pressure drop needed for the full degradation, is the critical shear stress, which is the wall shear stress in the pipe flow above which degradation starts at steady flow conditions. The difference between the two is that degradation by a device 18 is local, implying a very short time of exposure, whereas the critical wall shear stress is defined under steady flow conditions or an unlimited exposure time. For example, with 1,000 ppm of SPE95285 (a non-ionic surfactant by AKZO-Nobel Chemicals), the critical pressure drop on the local degradation device is 0.15 bar, whereas at the critical wall shear stress of 350 Pa over the length of 0.3 m of 15.2 mm diameter pipe is needed for close to complete degradation, or what amounts to a total pressure drop of 0.35 bar over the 0.3 m pipe length.

According to the invention the fluid should be designed for optimal heat transfer control. The critical shear stress and pressure drop needed for degradation, the energy needed for degradation, and the recovery time are three relevant parameters in the operation claimed method. They are normally coupled. Stronger fluids, which is to say fluids with higher concentrations of surfactant, typically show a higher drag-reducing ability, a higher pressure drop needed for degradation, and a shorter recovery time. Examples of stronger fluids include, but are not limited to SPE95285 at 1,000 ppm in water at a temperature greater than 20 C or Ethoquad T13 (by AKZO Chemicals) at 1,000 ppm and a temperature lower than 25 C. The mixing of surfactants, the addition of nonsurfactant additives such as alcohols and salts, namely counter ion for cationic surfactants, can change those relationships, allowing better optimization of fluid properties.

For example, the addition of n-decanol to Ethoquad T13 a surfactant manufactured by AKZO-Nobel Chemicals located at Stenungsund, Sweden, decreases fluid drag-reducing ability and increases the recovery time T1+T2. For example, 1,000 ppm by volume of n-decanol added to a 3,000 ppm solution of SPE95285 surfactant in water at a temperature of 9 C decreases the fluid drag-reducing ability from 70% to 50% under comparable conditions, and increases the recovery time, T1+T2, from 3 to 10 seconds. If enough surfactant is added to the solution to recover its drag reducing ability to the level before alcohol was added, the recovery time T1+T2 of the fully degraded fluid is still about two times higher than for the original solution. Alcohol can thus be used to increase recovery time of the fluid, while maintaining its drag-reducing ability.

Figure 4:
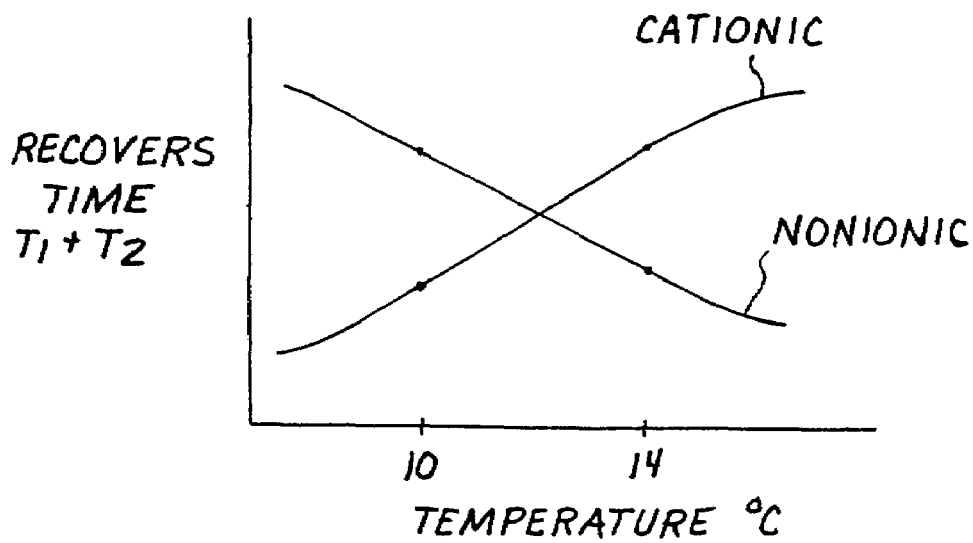
FIG. 4 is a graph of recovery time versus temperature of the surfactant solution for two "opposite" surfactants (e.g. a cationic and nonionic surfactant solution).

All surfactant solutions have their properties strongly dependent on temperature, as it can be readily seen from their phase diagrams (temperature, concentration, phase changes). For example, the recovery time of the SPE95285 surfactant in a cooling system is approximately halved as the temperature changes from 10 to 14 Celsius as depicted in FIG. 4. A similar mechanism operates in the case of heating systems operating in the range of 75 to 100 Celsius or even broader temperature ranges. Most cooling or heating systems work between fixed temperatures (ranging from 5 to 10 Celsius for cooling, for example). This means that optimization of the fluid properties cannot be done for both ends of the temperature range if the recovery time is a function of the temperature, resulting in reduced pumping power savings. The overly long recovery time needed to maintain the full heat transfer capacity of all heat exchangers reduces the total pumping power savings. The cationic surfactant Ethoquad, and apparently most cationic surfactants in general, on the one hand, and nonionic surfactants, on the other, have their phase diagrams as mirror images of each other in terms of temperature as depicted in FIG. 4. This means that for the nonionic surfactant the recovery time increases with reduced temperature. This corresponds to the transition from rod-like to globular micelles. The same phenomenon causes an increase in the recovery time for the cationic surfactant at increased temperature. Mixing two surfactants with opposite temperature dependence of recovery time (e.g. Ethoquad and SPE95285), makes their degradation and recovery properties almost temperature independent, which contributes greatly to optimized fluid characteristics in terms of adequate heat transfer control. For example, a mixture of 700 ppm by volume of Ethoquad T13 and 700 ppm of SPE95285 surfactant in water results in a mixture in which the recovery time varies no more than 20% over a temperature range from 8 C to 12 C.

In the most general case, degrading device 18 is placed immediately upstream of heat exchanger 12 for the purpose of temporarily degrading the fluid by imposing a high enough mechanical stress needed for breaking the micellar structures. A certain pressure drop on the degrading device, corresponding to a certain flow work per unit of the flow rate, is needed for degradation. Not all of this pressure drop is actually used for degradation work. A large part of it is dissipated in viscous effects. For example, in the case of a wire mesh degrading device, approximately 5% or less of the energy is used for degradation of the fluid and the remainder is dissipated in viscous effects.

The most effective degrading device 18 is one which can achieve total degradation of the fluid with the minimum pressure drop. The circulation pump must provide this pressure drop which reduces the total pumping power savings.

The most effective degrading device 18 is a distributed device, like a wire mesh 20 placed across the pipe cross section as shown in FIG. 2. The wire mesh 20 is about twice as effective as a conventional throttling valve. For example, total degradation is achieved with a pressure drop of 2 psi using mesh 20 as compared to the needed pressure drop of 3.5 psi for a throttling valve. This difference can be explained by the uniformity of the stress imposed on the all fluid particles flowing through mesh 20. Nowhere in the total cross section is the stress higher than needed for the total degradation, and all fluid particles are exposed to the necessary stress. In a conventional valve or other throttling device, if the stress imposed on the fluid in the center of the orifice of the valve is high enough for degradation, the stress close to the orifice edge is much higher than needed for degradation, resulting in unnecessarily high pressure drop on the throttling valve.

Pumps and flow control valves are elements of circulating systems, which dissipate locally large amounts of flow energy. Pumps, with a typical efficiency of 70% dissipate the remaining 30% of the total pumping power through viscous losses. That viscous loss work breaks the micelles. If the pump is appropriately located with respect to heat exchanger 12, such as upstream of the chiller in the cooling system, it takes care of heat transfer recovery in the chiller without the need for a additional degrading device 18 and its associated pressure drop.

Flow control valves normally installed for any cooling or heating coil impose typically 5 psi pressure drop even when open, and can be used to do the degradation job for those types of heat exchangers 12 using any surfactant solution with long enough recovery time to be useful for this type of application. Altogether, no dedicated degradation device 18, i.e. no additional pressure drop, may in fact be needed for the whole cooling or heating hydronic system using a typical surfactant solution (e.g. 1,500 ppm of SPE95285 at 8° C.), if the flow control valves and pump are appropriately located with respect to heat exchanger 12.

In a small circulating system it may be unacceptable to lose drag-reducing effects in long sections of pipes downstream of heat exchanger 12. This may be the case especially if the fluid shows a linear recovery immediately after degradation without a dead time to prevent any significant recovery of the degraded fluid during its residence in heat exchanger 12. As an alternative, a fluid with a short recovery time may be used, such as a 1,500 ppm of SPE95285 at 20 C, giving a recovery time of less than 5 seconds. However, such a fluid, once degraded at inlet 10 to heat exchanger 12, should be prevented from recovering in heat exchanger 12. This may be achieved by imposing high local stresses in heat exchanger 12 by installing inserts or devices 18 at regular spacing in heat exchanger fluid paths 14 and/or 16. The pressure drop on those inserts or devices 18 can be significantly lower than the pressure drop on the initial degrading device 18 needed for the initial degradation at inlet 10 to heat exchanger 12, while still preventing the recovery of the fluid. For example, the grid spacing of screen 20 may be larger in devices 18 downstream from the initial device 18 at inlet 10 than the grid of the latter. This is another source of energy savings. After exiting heat exchanger 12, the fluid can then recover very quickly, providing high level of drag reduction immediately downstream of heat exchanger 12. For example, a pressure drop greater than 1.4 psi is needed to degrade fully the fluid initially, whereas additional meshes with only 0.8 psi pressure drop and spaced 1.2 m apart can prevent recovery of the fluid.

Some fluids can have a high level of drag-reducing ability, which is close to asymptotic, and a very short recovery time, but relatively low critical shear stress or wall shear stress in the pipe which degrades the fluid in the steady flow condition at flow velocities only slightly higher than 2 m/s in a ½" pipe. Examples of such fluids are mixtures of SPE95285 and Ethoquad T13 after long-term recirculation. If the flow velocity in a heat exchanger is maintained above this critical velocity, there will be no drag and heat transfer reduction in heat exchanger 12. Of course, the wall shear stress must be kept lower in the rest of the system. Such a fluid may be degraded in conventional pipe fittings, but because of its fast recovery no significant total drag reducing effect is lost. In the case of the fluid above, the recovery occurs within 3 seconds.

A degrading device may be used at the inlet 10 to heat exchanger 12 when using a weak fluid, such as that above. However, a higher shear stress in heat exchanger fluid paths 14 and 16 as compared to the stress in the rest of the system can then be used to prevent fluid from recovering in heat exchanger 12, thereby providing the benefits of a short recovery time, as explained above.

Many alterations and modifications may be made by those having ordinary skill in the art without departing from the spirit and scope of the invention. While many of the specific above examples are given in terms of cooling systems, it must be emphasized that the invention applies with equal applicability to heating systems and applications. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A fluid having optimized properties of degradation and recovery comprising:
   a thermal transport fluid; and
   a surfactant additive having, when added to said thermal transport fluid, a substantial independence of drag-reducing ability, degradation, and recovery properties as a function of temperature.

2. The fluid of claim 1 wherein said surfactant additive comprises a mixture of surfactants with opposing effects of temperature on drag-reducing ability, degradation, and recovery time.

3. The fluid of claim 2 where said mixture of surfactants comprises a cationic surfactant and a nonionic surfactant in which opposing effects of said cationic surfactant and nonionic surfactant substantially cancel each other to provide a substantially temperature independent surfactant additive.

* * * * *